June 4, 1968 — L. ECONOMIDES ET AL — 3,386,366
AIR MIXING DEVICE
Filed Aug. 17, 1966 — 2 Sheets-Sheet 1
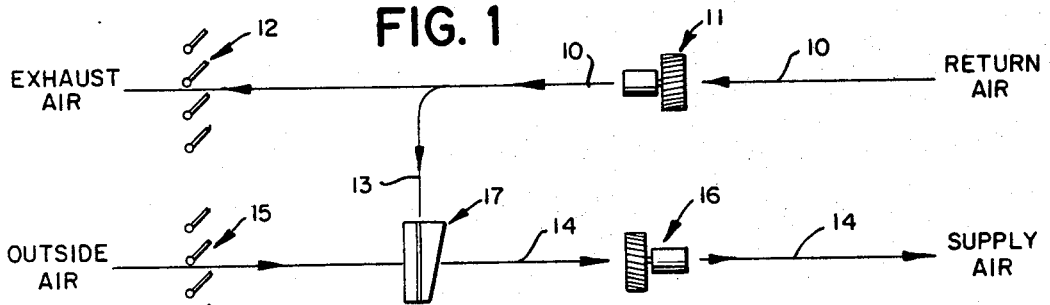
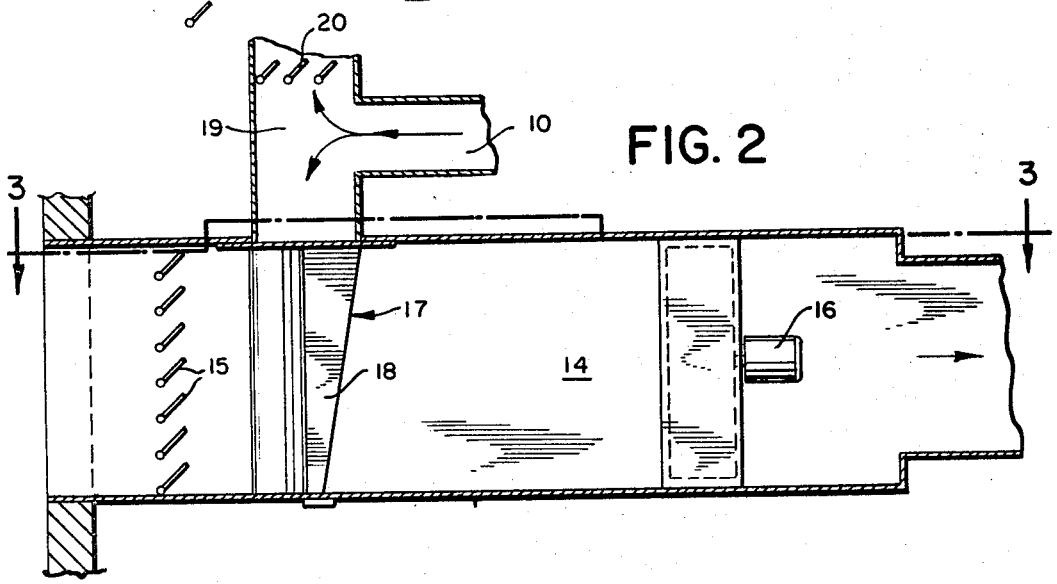
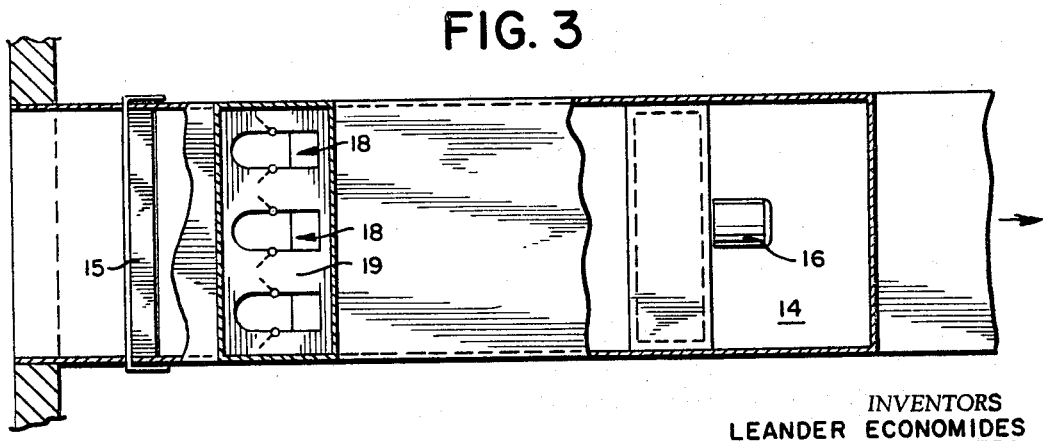
INVENTORS
LEANDER ECONOMIDES
NORMAN GOLDBERG
BY Darby & Darby
ATTORNEYS

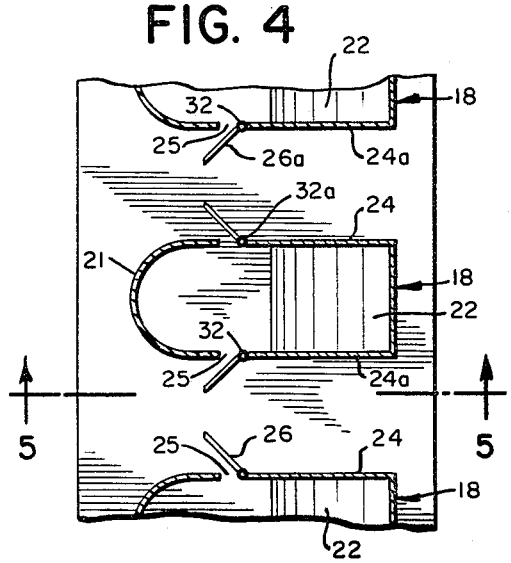
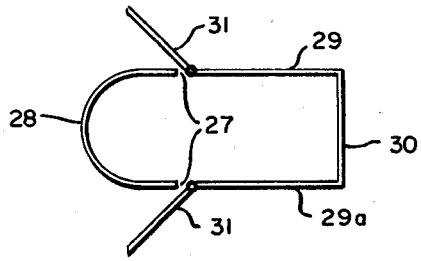
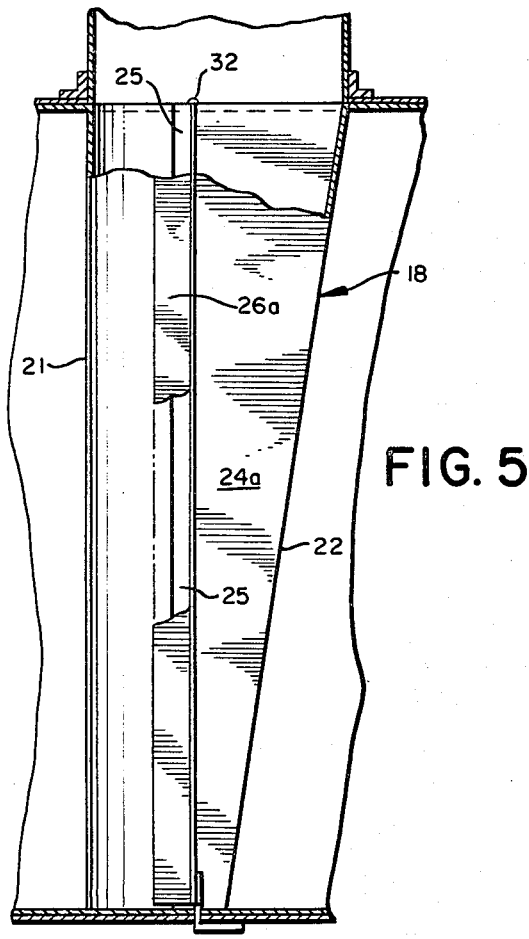
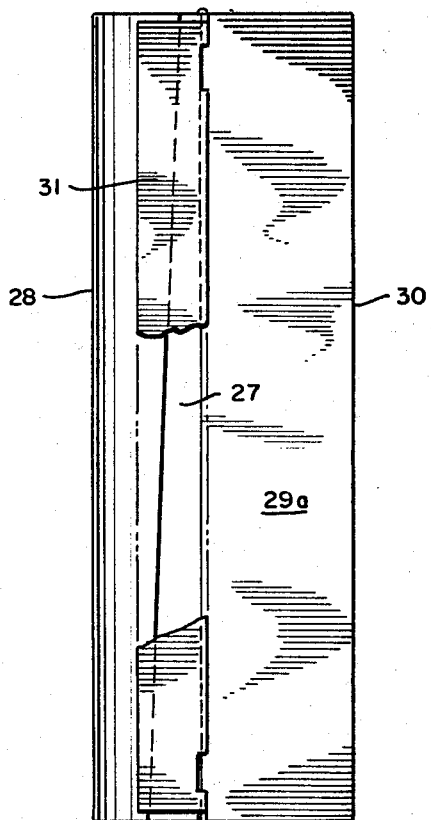

United States Patent Office 3,386,366
Patented June 4, 1968

3,386,366
AIR MIXING DEVICE
Leander Economides, 308 Glenwood Ave., Leonia, N.J. 07605, and Norman Goldberg, 1411 Ave. N, Brooklyn N.Y. 11230
Filed Aug. 17, 1966, Ser. No. 573,033
5 Claims. (Cl. 98—38)

ABSTRACT OF THE DISCLOSURE

An air mixture device having a plurality of air distributing ducts located perpendicular to and within a supply air duct. The distributing ducts are connected to a return air duct.

This application relates to apparatus for mixing warm return air from a central air conditioning or central ventilating system with fresh air entering the system.

In the past, central air conditioning and ventilating systems have mixed a certain portion of the return air with the fresh air to modify the temperature of the incoming air supply or for other purposes. The apparatus generally employed for such recirculation has, however, resulted in stratification of the return air and supply air, thereby resulting in freezing of air ducts and equipment as a result of stratification of the cold incoming air and the warm return air. In addition, such stratification causes difficulties in the temperature control obtainable in such a system, thus causing temperature variations throughout the system.

It is the object of the present invention to provide apparatus for the recirculation of a portion of the return air in a ventilating system in such a manner as to prevent stratification of the mixed air supply.

The invention of the present application provides means for introducing the return air into the supply air feed line so as to provide a series of air streams of uniform small cross-section which upon traveling a short distance through the supply air duct can uniformly intermix, providing a substantially uniform temperature throughout the cross-section of the duct.

The manner in which the foregoing and other objects of the present invention can be accomplished will be apparent from the following specification and claims considered together with the accompanying drawings, in which:

FIGURE 1 is a schematic view of an air supply system showing the invention of the present application.

FIGURE 2 is an enlarged plan view of the return air duct entering the supply air duct.

FIGURE 3 is a cross-sectional view along line 3—3 of FIGURE 2.

FIGURE 4 is an enlarged cross-sectional view of the infusion apparatus of the present invention.

FIGURE 5 is a view along line 5—5 of FIGURE 4.

FIGURE 6 is an enlarged view of a portion of the infusion apparatus of a second embodiment of the present invention.

FIGURE 7 is a plan view of the infusion apparatus of a second embodiment of the present invention.

Referring to FIGURE 1, a return air duct 10 in a ventilating system containing an exhaust fan 11 is provided with a set of exhaust dampers 12 leading to the outside. A similar inlet duct 14 is also provided with a set of inlet dampers 15 and an inlet fan 16. A cross duct 13 connects the return air duct 10 and the supply air duct 14. The infusion apparatus 17 of the present invention is located at the junction of the cross duct 13 and the supply air duct 14.

The return air duct 10 as shown in detail in FIGURE 2 terminates in a T-shaped outlet 19 with branches to the left and right. A set of dampers 20 is provided in the branch of the T which leads to the outside air. The opposite branch of the T terminates in the infusion apparatus 17.

As shown in FIGURES 3, 4 and 5, the infusion apparatus 17 consists of a series of parallel tubes 18, each of which has a bull-nosed front wall 21 facing toward the inlet, a flat top 24 and bottom wall 24a and a tapered rear wall 22. The rear wall 22 tapers to provide a smaller chamber as the air from the return crosses the supply air duct. The top and bottom walls 24, 24a of each of the units 18 has a rectangular slot 25 which extends the width of the supply air duct. Dampers 26 and 26a are provided in connection with slots 25 to allow variation in the opening provided. The hinges 32 and 32a of the dampers 26, 26a are located downstream of openings 25 in order to provide a counterflow of return air to the incoming air, thereby achieving a more uniform intermixing of the return air and the supply air. The counterflow thus achieved results in a complete mixing of the air supply close to the tube 18.

The provision of tapered tube 18 provides a constant air pressure throughout the length of tube 18 as air is expelled through slots 25. The loss of pressure due to expulsion of air from the slot near the inlet is compensated by the reduced diameter of the tube as it leads from the inlet. This insures that a uniform air flow occurs throughout the length of slots 25.

A second embodiment is shown in FIGURES 6 and 7 and is located in conjunction with the cross air duct 13 in the same manner as the previous embodiment. The second embodiment has a bull-nosed front end 28, a pair of parallel top and bottom walls 29 and 29a and a rear wall 30 which is perpendicular to the flow of air in the supply air duct. A tapered slot 27 having its small width at the return air duct 10 and its large width at the opposite side of the supply air duct is provided in both the top and bottom surface of the unit. Dampers 31 are provided in connection with each of the slots in order to vary the amount of return air exiting from the slots 27.

In operation, a portion of the return air in return air duct 10 is diverted by means of dampers 20 and 12 to the infusion chamber 17, located in the supply air duct 14. The quantity of air recirculated is also controlled by means of dampers 26 located in the tubes 18. The dampers 26 also control the entrance speed of the return air into the supply air duct. By providing a tapered tube with a rectangular slot of properly selected dimensions or a rectangular tube with a tapered slot, a uniform amount of return air is mixed into the supply air for each unit of cross-sectional area. By providing a plurality of tubes 18, a number of small streams of return air and supply air are created, and optimum mixing can occur during the downstream flow of the air. The second embodiment of FIGURES 6 and 7 achieves the same objective as the first embodiment by means of the tapered slot 31 which uniformly distributes the used warm return air across the width of the supply air duct in the same manner as the tapered tube of the first embodiment.

Although slots have been shown in both embodiments of the invention disclosed, perforations could be substituted. For instance, in a constant diameter tube the size or number of perforations could be varied with the smallest discharge area located near the inlet, and the largest discharge area located on the opposite side of the supply ducts. If a tapered tube is used, a line of perforations of constant discharge per unit length could be used.

As is apparent to anyone skilled in the art, the number of infusion units to be located in the supply air duct depends upon the volume and dimensions of the air supply system. The number of units selected, however, should create a number of small air streams capable of intermixing downstream of the infusion apparatus to provide a uniform temperature gradation across the supply air duct.

By maintaining a uniform temperature gradation, uniformity of distribution of the supply air is insured downstream at the various outlets of the air conditioning system. In addition, freezing caused by stratification of the supply air and the return air is prevented by the uniform mixing achieved by the present invention. The taper to be selected for the infusion units is dependent on pressure and volume and can be readily calculated by one skilled in the art.

What is claimed is:

1. In an air conditioning and ventilating system containing in combination a return air duct, a supply air duct, a cross duct between the return air duct and the supply air duct and means for selectively diverting a portion of the return air through the cross duct into the supply duct, the improvement comprising a plurality of tubes within and perpendicular to the supply air duct and connected to the cross duct, said tubes being provided with means for uniformly distributing the diverted portion of the return air in the supply air duct.

2. The apparatus of claim 1, wherein the tubes are tapered, said tubes having their larger diameter at the cross duct and their smaller diameter at the opposite end, said tubes further being provided with a rectangular slot perpendicular to the supply duct, on the top and bottom, and having a length equal to substantially the width of the supply duct.

3. The apparatus of claim 1 wherein the tubes are of uniform cross-section, said tubes further being provided with a tapered slot top and bottom, said slot having its smallest width at the cross duct and its greatest width at the opposite end.

4. Apparatus according to claim 2, further including a damper associated with each of said slots, said damper having its hinged side downstream of the slot.

5. Apparatus according to claim 3, further including a damper associated with each of said slots, said damper having its hinged side downstream of the slot.

References Cited

UNITED STATES PATENTS

| | | | |
|---|---|---|---|
| 3,114,505 | 12/1963 | Kennedy | 236—13 |
| 3,212,424 | 10/1965 | Davis | 98—38 |
| 3,194,307 | 7/1965 | Wood | 98—38 X |

ROBERT A. O'LEARY, *Primary Examiner.*

W. E. WAYNER, *Assistant Examiner.*